(12) United States Patent
Sugata et al.

(10) Patent No.: US 12,066,594 B2
(45) Date of Patent: Aug. 20, 2024

(54) OPTICAL LAMINATE, TRANSFER LAMINATE, AND METHOD FOR MANUFACTURING OPTICAL LAMINATE

(71) Applicant: DEXERIALS CORPORATION, Tokyo (JP)

(72) Inventors: Hiroshi Sugata, Tokyo (JP); Shunichi Kajiya, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 929 days.

(21) Appl. No.: 16/972,254

(22) PCT Filed: May 24, 2019

(86) PCT No.: PCT/JP2019/020607
§ 371 (c)(1),
(2) Date: Dec. 4, 2020

(87) PCT Pub. No.: WO2019/235254
PCT Pub. Date: Dec. 12, 2019

(65) Prior Publication Data
US 2021/0239882 A1 Aug. 5, 2021

(30) Foreign Application Priority Data
Jun. 8, 2018 (JP) ................................. 2018-110294

(51) Int. Cl.
*G02B 1/118* (2015.01)
*B29D 11/00* (2006.01)
(Continued)

(52) U.S. Cl.
CPC .......... *G02B 1/118* (2013.01); *B29D 11/0073* (2013.01); *B32B 3/30* (2013.01);
(Continued)

(58) Field of Classification Search
CPC ........................... G02B 1/118; B29D 11/0073
See application file for complete search history.

(56) References Cited

U.S. PATENT DOCUMENTS 7,771,832 B2* 8/2010 Nakayama .............. C03C 1/006
428/435
7,811,684 B2* 10/2010 Yamada ................... G02B 1/11
428/432
(Continued)

FOREIGN PATENT DOCUMENTS

CN 104937695 A 9/2015
CN 106461813 A 2/2017
(Continued)

OTHER PUBLICATIONS

Sep. 19, 2022, Korean Office Action issued for related KR Application No. 10-2020-7034931.
(Continued)

*Primary Examiner* — Bao-Luan Q Le
(74) *Attorney, Agent, or Firm* — Paratus Law Group, PLLC

(57) ABSTRACT

To form an optical body having a micro concave-convex structure on at least part of an adherend with high accuracy. Provided is an optical laminate including an adherend, a bonding layer formed on at least part of a surface of the adherend, and an optical body bonded to the adherend with the bonding layer. A micro concave-convex structure in which concavities and convexities are arranged at an average cycle less than or equal to a visible light wavelength is formed in at least one surface of the optical body. The bonding layer is provided on the other surface of the optical body. An initial 90° peeling force when peeling the optical body from a transfer body having an inverted concave-convex structure fitted in the micro concave-convex struc-
(Continued)

ture of the optical body is less than or equal to 70% of a 90° peeling force between the optical body and the bonding layer.

6 Claims, 7 Drawing Sheets

(51) Int. Cl.
  *B32B 3/30* (2006.01)
  *B32B 7/023* (2019.01)
  *B32B 7/06* (2019.01)
  *B32B 7/12* (2006.01)

(52) U.S. Cl.
  CPC .............. *B32B 7/023* (2019.01); *B32B 7/06* (2013.01); *B32B 7/12* (2013.01); *B32B 2551/00* (2013.01)

(56) References Cited

U.S. PATENT DOCUMENTS

| | | | | |
|---|---|---|---|---|
| 9,145,473 | B2* | 9/2015 | Nakayama | C08G 73/1028 |
| 9,158,038 | B2* | 10/2015 | Taguchi | G02B 1/118 |
| 9,158,040 | B2* | 10/2015 | Kamiyama | B29C 59/022 |
| 9,429,685 | B2* | 8/2016 | Minoura | C09J 133/10 |
| 9,442,222 | B2* | 9/2016 | Fukui | B29C 33/424 |
| 9,678,248 | B2* | 6/2017 | Fukui | B29C 33/424 |
| 2006/0199040 | A1* | 9/2006 | Yamada | G02B 1/118 |
| | | | | 428/701 |
| 2007/0195417 | A1* | 8/2007 | Yamamoto | H04N 9/3114 |
| | | | | 359/590 |
| 2008/0310026 | A1* | 12/2008 | Nakayama | C09D 171/00 |
| | | | | 428/689 |
| 2010/0247863 | A1* | 9/2010 | Nakayama | G02B 1/118 |
| | | | | 427/162 |
| 2012/0069443 | A1* | 3/2012 | Taguchi | G02B 1/118 |
| | | | | 359/601 |
| 2012/0314294 | A1* | 12/2012 | Nakayama | B05D 5/063 |
| | | | | 528/26 |
| 2013/0057958 | A1* | 3/2013 | Minoura | C09J 133/10 |
| | | | | 359/601 |
| 2013/0273317 | A1* | 10/2013 | Nakayama | C08G 73/1046 |
| | | | | 428/141 |
| 2014/0175707 | A1 | 6/2014 | Wolk et al. | |
| 2014/0320970 | A1* | 10/2014 | Kamiyam | B29C 59/022 |
| | | | | 359/601 |
| 2015/0049389 | A1* | 2/2015 | Minoura | G02B 1/118 |
| | | | | 359/601 |
| 2015/0158268 | A1 | 6/2015 | Koike et al. | |
| 2015/0168609 | A1* | 6/2015 | Fukui | G02B 1/118 |
| | | | | 359/601 |
| 2015/0168610 | A1* | 6/2015 | Fukui | B29C 33/3842 |
| | | | | 249/117 |
| 2016/0005886 | A1 | 1/2016 | Zou, III et al. | |
| 2017/0168198 | A1 | 6/2017 | Kajiya | |

FOREIGN PATENT DOCUMENTS

| | | |
|---|---|---|
| CN | 107111002 A | 8/2017 |
| JP | 2003-053901 A | 2/2003 |
| JP | 2004-358925 A | 12/2004 |
| JP | 2011-070116 A | 4/2011 |
| JP | 2011-154162 A | 8/2011 |
| JP | 2014-073610 A | 4/2014 |
| JP | 2016-210150 A | 12/2016 |
| KR | 10-2015-0099814 A | 9/2015 |
| KR | 2017-0100507 A | 9/2017 |
| WO | WO 2013/187349 A1 | 12/2013 |
| WO | WO 2019/009200 A1 | 1/2019 |

OTHER PUBLICATIONS

Jun. 1, 2023, Korean Trial Decision on Appeal issued for related KR Application No. 10-2020-7034931.
Dec. 21, 2022, Korean Office Action issued for related KR Application No. 10-2022-7042446.
Apr. 8, 2022, Chinese Office Action issued for related CN Application No. 201980038128.8.
Jan. 7, 2023, Combined Taiwanese Office Action and Search Report issued for related TW Application No. 108118226.
Feb. 15, 2022, Japanese Office Action issued for related JP Application No. 2018-110294.
Feb. 9, 2022, European Search Report issued for related EP Application No. 19814092.3.
Sep. 1, 2023, Korean Office Action issued for related KR Application No. 10-2023-7026347.
Oct. 21, 2021, Chinese Office Action issued for related CN Application No. 201980038128.8.
Mar. 8, 2022, Korean Office Action issued for related KR Application No. 10-2020-7034931.

* cited by examiner

OPTICAL LAMINATE, TRANSFER LAMINATE, AND METHOD FOR MANUFACTURING OPTICAL LAMINATE

CROSS REFERENCE TO PRIOR APPLICATION

This application is a National Stage Patent Application of PCT International Patent Application No. PCT/JP2019/020607 (filed on May 24, 2019) under 35 U.S.C. § 371, which claims priority to Japanese Patent Application No. 2018-110294 (filed on Jun. 8, 2018), which are all hereby incorporated by reference in their entirety.

TECHNICAL FIELD

The present invention relates to an optical laminate, a transfer laminate, and a method for manufacturing an optical laminate.

BACKGROUND ART

In electronic apparatuses including display devices such as a liquid crystal display and optical devices such as a camera, an anti-reflection film is often formed on a light incident surface in order to avoid deterioration of function due to light reflection (for example, deterioration of visibility or image quality due to light reflection (more specifically, occurrence of color unevenness, ghost, or the like)). As anti-reflection films, a micro concave-convex film (also called a moth-eye film) having a micro concave-convex structure, Wet-AR film, Dry-AR film, and the like are known.

CITATION LIST

Patent Literature

Patent Literature 1: WO 2013/187349 A1

SUMMARY OF INVENTION

Technical Problem

In association with recent reduction in size and thickness of electronic apparatuses, it is required to form an anti-reflection film on a partial region of an adherend. As an example, a transparent region (also called a camera hole) for causing light to enter a camera module (what is called a front camera) is formed in some cases in a substrate that constitutes the front surface of a smartphone. In such a smartphone, the anti-reflection film is required to be formed only on the rear surface of the transparent region (a surface on the inner side of the smartphone). Furthermore, there is a limit on size reduction of the camera module. Thus, for reduction in size and thickness of the smartphone, the anti-reflection film is required to be formed as a thin film.

However, the above-described requirements have not been met with a technology through use of a Wet-AR film or Dry-AR film. Specifically, as the technology through use of a Wet-AR film, a technology of cutting a laminate film including a Wet-AR layer, a transparent resin layer, and a bonding layer into a desired size, and bonding the cut laminate film to an adherend has been proposed. The Wet-AR layer is formed by sequentially applying materials of the Wet-AR layer (a low refractive index material and a high refractive index material) onto the transparent resin layer. However, this technology does not fully meet the requirement for reduction in thickness since the laminate film is significantly increased in thickness. As the technology through use of a Dry-AR film, a technology of covering a region other than a desired region of an adherend with a mask, and forming a Dry-AR film only on the desired region by sputtering or the like has been proposed. However, this technology is disadvantageous in terms of very poor production efficiency since many regions of the adherend need to be covered with the mask. In addition, the quality of the formed Dry-AR film is not sufficient.

On the other hand, a micro concave-convex film can be reduced in thickness, and is therefore expected to meet the above-described requirements. However, any technology of forming a micro concave-convex film in part of the surface of an adherend with high accuracy has not been proposed. Note that Patent Literature 1 describes a function transfer body including a carrier having a micro concave-convex structure in a surface, and a functional layer formed on the micro concave-convex structure. This functional layer has a configuration equivalent to the above-described micro concave-convex film. In Patent Literature 1, the functional layer of the function transfer body is transferred to the adherend. However, with the technology disclosed in Patent Literature 1, the micro concave-convex structure is used for a purpose other than anti-reflection, and the transfer accuracy is less than sufficient.

Therefore, the present invention was made in view of the above-described problems, and the present invention has an object to form an optical body having a micro concave-convex structure in at least part of an adherend with high accuracy.

Solution to Problem

According to an aspect of the present invention in order to achieve the above-mentioned object, there is provided an optical laminate including an adherend, a bonding layer formed on at least part of a surface of the adherend, and an optical body bonded to the adherend with the bonding layer, in which a micro concave-convex structure in which concavities and convexities are arranged at an average cycle less than or equal to a visible light wavelength is formed in at least one surface of the optical body, and the bonding layer is provided on the other surface of the optical body, and an initial 90° peeling force when peeling the optical body from a transfer body having an inverted concave-convex structure fitted in the micro concave-convex structure of the optical body is less than or equal to 70% of a 90° peeling force between the optical body and the bonding layer.

Herein, the optical body may be peeled from a transfer laminate, the transfer laminate may have the optical body, the transfer body, and a covering body that covers one of the surfaces of the optical body that is located on a side where the transfer body is not provided, and a 90° peeling force between the optical body and the covering body may be smaller than a 90° peeling force between the optical body and the transfer body including tearing of the optical body.

According to another aspect of the present invention, there is provided an optical laminate including an adherend, a bonding layer formed on at least part of a surface of the adherend, and an optical body bonded to the adherend with the bonding layer, in which a micro concave-convex structure in which concavities and convexities are arranged at an average cycle less than or equal to a visible light wavelength is formed in at least one surface of the optical body, the bonding layer is formed on the other surface of the optical body, and a 90° peeling force between the optical body and the bonding layer is more than or equal to 13 N/25 mm.

Herein, a total thickness of the optical body and the bonding layer may be less than or equal to 15 μm.

In addition, the bonding layer may be made of an ultraviolet-curing resin.

According to another aspect of the present invention, there is provided a transfer laminate including an optical body, in at least one surface of which a micro concave-convex structure in which concavities and convexities are arranged at an average cycle less than or equal to a visible light wavelength is formed, a transfer body having an inverted concave-convex structure fitted in the micro concave-convex structure of the optical body, and a covering body that covers one of surfaces of the optical body that is located on a side where the transfer body is not provided, in which a 90° peeling force between the optical body and the covering body is smaller than a 90° peeling force between the optical body and the transfer body including tearing of the optical body.

Herein, a surface of the inverted concave-convex structure may have been subjected to mold release treatment.

According to another aspect of the present invention, there is provided a method for manufacturing an optical laminate, including producing a transfer laminate having an optical body, in at least one surface of which a micro concave-convex structure in which concavities and convexities are arranged at an average cycle less than or equal to a visible light wavelength is formed, and a transfer body having an inverted concave-convex structure fitted in the micro concave-convex structure of the optical body, forming an uncured bonding layer on at least part of a surface of an adherend, pressing the transfer laminate against the adherend such that an exposed surface of the optical body comes into contact with the uncured bonding layer, curing the uncured bonding layer, and peeling the optical body from the transfer body, in which an initial 90° peeling force when peeling the optical body from the transfer body is less than or equal to 70% of a 900 peeling force between the optical body and the bonding layer.

Herein, the transfer laminate may further have a covering body that covers one of surfaces of the optical body that is located on a side where the transfer body is not provided. In the method for manufacturing an optical laminate, the transfer laminate may be pressed against the adherend after peeling the covering body from the transfer laminate, and a 90° peeling force between the optical body and the covering body may be smaller than a 90° peeling force between the optical body and the transfer body including tearing of the optical body.

Advantageous Effects of Invention

According to the present invention, as described above, the initial 90° peeling force when peeling the optical body from the transfer body is less than or equal to 70% of the 90° peeling force between the bonding layer and the adherend, so that the optical body having the micro concave-convex structure can be formed on (transferred to) at least part of the adherend with high accuracy.

DESCRIPTION OF EMBODIMENTS

Figure 1:
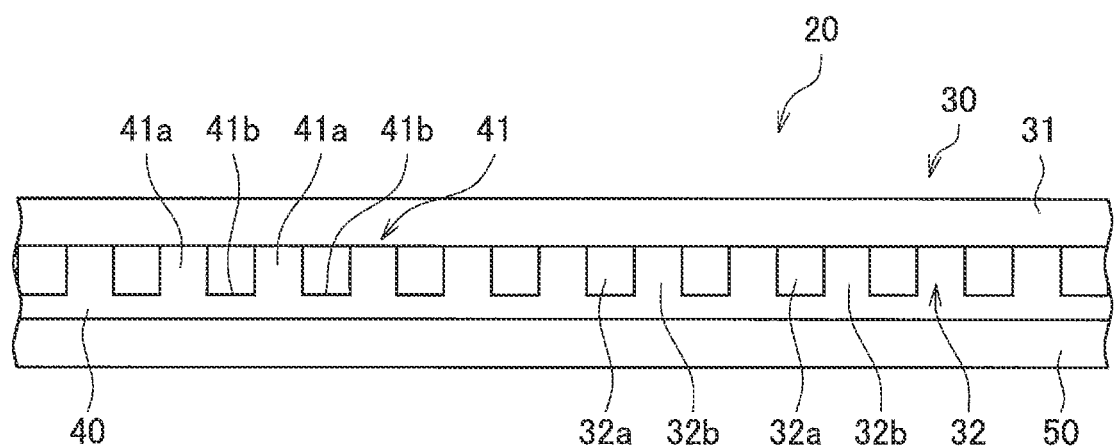
FIG. 1 is a cross-section diagram illustrating a configuration of a transfer laminate according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Configuration of Transfer Laminate>

Figure 2:
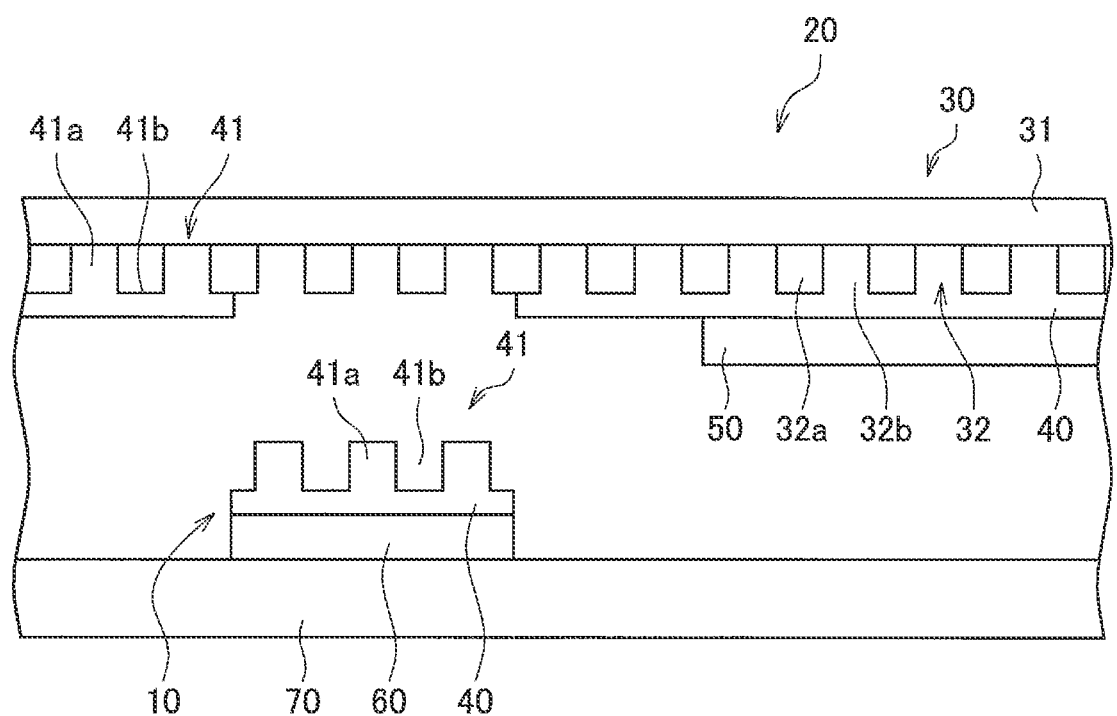
FIG. 2 is an explanatory diagram illustrating an appearance in which part of an optical body constituting the transfer laminate according to the embodiment has been transferred to an adherend.

First, a configuration of a transfer laminate 20 according to the present embodiment will be described with reference to FIG. 1 to FIG. 2. The transfer laminate 20 is a film laminate for transferring an optical body 40 to an adherend 70, and includes a transfer body 30, the optical body 40, and a covering body 50.

(1-1. Transfer Body)

The transfer body 30 protects the optical body 40, and provides the optical body 40 with a micro concave-convex structure 41. Specifically, the transfer body 30 includes a base material film 31, and a micro concave-convex structure 32 formed in one surface of the base material film 31. In the present embodiment, the base material film 31 and the micro concave-convex structure 32 are separate from each other, but may be integrally molded. In this case, the base material film 31 and the micro concave-convex structure 32 are made of the same material (such as, for example, a curing resin or thermoplastic resin which will be described later).

The type of the base material film 31 is not particularly restricted, but preferably is transparent and less prone to break. In a case where the base material film 31 is transparent, the base material film 31 can transmit ultraviolet rays for curing the optical body 40 or a bonding layer 60 yet to be cured. Examples of the base material film 31 include a polyethylene terephthalate (PET) film or a triacetyl cellulose (TAC) film.

The micro concave-convex structure 32 is provided in one surface of the base material film 31. The micro concave-convex structure 32 has a structure in which concavities and convexities are arranged at an average cycle less than or equal to a visible light wavelength. In other words, the micro concave-convex structure 32 includes large numbers of micro convexities 32a and micro concavities 32b. The micro convexities 32a are portions protruding in the thickness direction of the base material film 31, and the micro concavities 32b are portions recessed in the thickness direction of the base material film 31. The micro concave-convex structure 32 has an inverted shape (inverted concave-convex structure) of the micro concave-convex structure 41 of the optical body 40, and are fitted in the micro concave-convex structure 41.

The average cycle of the concavities and convexities is less than or equal to a visible light wavelength (for example, less than or equal to 830 nm). The upper limit value of the average cycle preferably is less than or equal to 350 nm, and more preferably is less than or equal to 280 nm. The lower limit value of the average cycle preferably is more than or equal to 100 nm, and more preferably is more than or equal to 150 nm. Consequently, the micro concave-convex structure 32 is what is called a moth-eye structure. Consequently, the micro concave-convex structure 41 of the optical body 40 also has a moth-eye structure, and an anti-reflection function is achieved by the micro concave-convex structure 41. In a case where the average cycle of the concavities and convexities of the micro concave-convex structure 32, that is, the average cycle of the concavities and convexities of the micro concave-convex structure 41, has a value within the above-described range, the anti-reflection function of the micro concave-convex structure 41 is further improved.

Herein, in a case where the average cycle is less than 100 nm, the micro concave-convex structure 32 may be difficult to form. Alternatively, in a case where the average cycle exceeds 350 nm, a phenomenon of diffraction of visible light may occur in the micro concave-convex structure 41.

The average cycle of the micro concave-convex structure 32 is an arithmetic mean value of distances between the micro convexities 32a, 32a or the micro concavities 32b, 32b adjacent to each other. Note that the micro concave-convex structure 32 can be observed with a scanning electron microscope (SEM), cross-sectional transmission electron microscope (cross-sectional TEM), or the like, for example. In addition, the method for calculating the average cycle is as follows, for example. That is, a plurality of combinations of the micro convexities 32a, 32a adjacent to each other or a plurality of combinations of the micro concavities 32b, 32b adjacent to each other are picked up, and distances (pitches) between them are measured. Note that the distance between the micro convexities 32a, 32a is the distance between the peaks of the micro convexities 32a, 32a, for example. In addition, the distance between the micro concavities 32b, 32b is the distance between the central points of the micro concavities 32b, 32b, for example. Then, the average cycle may be calculated by obtaining an arithmetic mean of measured values. The average cycle of the micro concave-convex structure 41 which will be described later can also be measured by a similar method.

In addition, the height of concavities/convexities (the height of the micro convexities 32a or the depth of the micro concavities 32b) is not particularly restricted. For example, the upper limit value of the height of concavities/convexities preferably is less than or equal to 300 nm, and more preferably is less than or equal to 230 nm. For example, the lower limit value of the height of concavities/convexities preferably is more than or equal to 150 nm, and more preferably is more than or equal to 190 nm. In this case, the anti-reflection function of the micro concave-convex structure 41 which will be described later is further improved.

The arrangement of the micro concave-convex structure 32 is not particularly restricted, but may be a periodic arrangement, or may be a random arrangement. Examples of the periodic arrangement include a staggered lattice arrangement, rectangular lattice arrangement, and the like. In addition, the shape of the micro convexities 32a and the micro concavities 32b is not particularly restricted. The shape of the micro convexities 32a and the micro concavities 32b may be a shell type, pyramidal, columnar, or needle-like, for example. Note that the shape of the micro concavities 32b indicates the shape formed by the inner wall surface of the micro concavities 32b.

The micro concave-convex structure 32 is made of an ultraviolet-curing resin, for example. The ultraviolet-curing resin preferably is transparent. In a case where the micro concave-convex structure 32 is transparent, the micro concave-convex structure 32 can transmit ultraviolet rays for curing the optical body 40 or the bonding layer 60 yet to be cured. From such a perspective, the ultraviolet-curing resin preferably is an ultraviolet-curing acrylic resin or ultraviolet-curing epoxy resin, for example.

The ultraviolet-curing epoxy resin includes an ultraviolet-curing initiator and a polymerizable epoxy compound. Examples of ultraviolet-curing initiators include 2,2-dimethoxy-1,2-diphenylethane-1-one, 1-hydroxy-cyclohexyl phenyl ketone, and 2-hydroxy-2-methyl-1-phenyl propane-1-one. A polymerizable epoxy compound is a monomer, oligomer, or prepolymer having one or multiple epoxy groups in the molecule. Examples of polymerizable epoxy compounds include various bisphenol epoxy resins (such as bisphenol A and F), novolac epoxy resin, various modified epoxy resins such as rubber or urethane, naphthalene epoxy resin, biphenyl epoxy resin, phenol novolac epoxy resin, stilbene epoxy resin, triphenol methane epoxy resin, dicyclopentadiene epoxy resin, triphenyl methane epoxy resin, and prepolymers of the above.

The ultraviolet-curing acrylic resin includes the ultraviolet-curing initiator and polymerizable acrylic compound described above. A polymerizable acrylic compound is a monomer, oligomer, or prepolymer having one or multiple acrylic groups in the molecule. Herein, monomers are further classified into monofunctional monomers having one acrylic group in the molecule, bifunctional monomers having two acrylic groups in the molecule, and multifunctional monomers having three or more acrylic groups in the molecule.

Examples of "monofunctional monomers" include carboxylic acids (acrylic acids), hydroxy monomers (2-hydroxyethyl acrylate, 2-hydroxypropyl acrylate, 4-hydroxybutyl acrylate), alkyl or alicyclic monomers (isobutyl acrylate, t-butyl acrylate, isooctyl acrylate, lauryl acrylate, stearyl acrylate, isobornyl acrylate, cyclohexyl acrylate), other functional monomers (2-methoxyethyl acrylate, methoxyethylene glycol acrylate, 2-ethoxyethyl acrylate, tetrahydrofurfuryl acrylate, benzyl acrylate, ethyl carbitol acrylate, phenoxyethyl acrylate, N,N-dimethylamino ethyl acrylate, N,N-dimethylamino propyl acrylamide, N,N-dimethyl acrylamide, acryloyl morpholine, N-isopropyl acrylamide, N,N-diethyl acrylamide, N-vinylpyrrolidone, 2-(perfluorooctyl)ethyl acrylate, 3-perfluorohexyl-2-hydroxypropyl acrylate, 3-perfluorooctyl-2-hydroxypropyl-acrylate, 2-(perfluorodecyl)ethyl-acrylate, 2-(perfluoro-3-methylbutyl)ethyl acrylate), 2,4,6-tribromophenol acrylate, 2,4,6-tribromophenol methacrylate, 2-(2,4,6-tribromophenoxy)ethyl acrylate), and 2-ethylhexyl acrylate.

Examples of "bifunctional monomers" include tri(propylene glycol) di-acrylate, trimethylolpropane-diaryl ether, and urethane acrylate.

Examples of "multifunctional monomers" include trimethylolpropane tri-acrylate, dipentaerythritol penta- and hexa-acrylate, and ditrimethylolpropane tetra-acylate.

Examples other than the polymerizable acrylic compounds listed above include acrylmorpholine, glycerol acrylate, polyether acrylates, N-vinylformamide, N-vinylcaprolactone, ethoxy diethylene glycol acrylate, methoxy triethylene glycol acrylate, polyethylene glycol acrylate, ethoxylated trimethylolpropane tri-acrylate, ethoxylated bisphenol A di-acrylate, aliphatic urethane oligomers, and polyester oligomers.

Herein, in the present embodiment, an initial 90° peeling force when peeling the optical body 40 from the transfer body 30 is less than or equal to 70% of a 90° peeling force between the optical body 40 and the bonding layer 60, and preferably is less than or equal to 15%. Therefore, a resin that satisfies this requirement may be selected from among the resins listed above. For example, it is desirable for the resin constituting the micro concave-convex structure 32 to be solid at a temperature during transport or peeling in order to hold the optical body 40 on the transfer body 30. Thus, one having a glass transition temperature after curing of more than or equal to the temperature during transport or peeling preferably is selected from among the resins or resin mixtures listed above. In addition, from the perspective of holding the micro concave-convex structure, it is desirable that the resins or resin mixtures listed above have a higher storage elastic modulus after curing, which preferably is more than or equal to 500 MPa, and more preferably is more than or equal to 1 GPa. A resin may be selected from such a perspective. Note that details of the peeling forces will be described later.

In addition, various additives may be added to the resin constituting the micro concave-convex structure 32. Examples of such additives include inorganic fillers, organic fillers, leveling agents, surface conditioners, and anti-foaming agents. Note that examples of types of inorganic fillers include metal oxide particulates such as $SiO_2$, $TiO_2$, $ZrO_2$, $SnO_2$, and $Al_2O_3$. Furthermore, a mold release agent or the like may be added to the resin constituting the micro concave-convex structure 32 such that the transfer body 30 and the optical body 40 can be separated easily.

A surface of the micro concave-convex structure 32 preferably is subjected to mold release treatment. This enables the optical body 40 to be peeled easily from the transfer body 30. More specifically, the initial 90° peeling force when peeling the optical body 40 from the transfer body 30 can be reduced.

Herein, the mold release treatment is not particularly restricted, but may be any treatment that can reduce the initial 90° peeling force when peeling the optical body 40 from the transfer body 30. An example is treatment of applying a mold release agent. This treatment includes inorganic film forming treatment, activation treatment, and mold release agent applying treatment. Specific treatment will be described below.

(Inorganic Film Forming Treatment)

An inorganic film is formed on the surface of the micro concave-convex structure 32 by sputtering or the like. The inorganic film forming treatment is performed for fixing the mold release agent to the surface of the micro concave-convex structure 32. An inorganic substance constituting the inorganic film is not particularly restricted, but examples thereof include indium tin oxide (ITO), $SiO_2$, Si, $SiN_x$, $TiO_2$, and the like. One or multiple types of them can be sputtered. Note that the inorganic film preferably is transparent. In this case, the inorganic film can transmit ultraviolet rays for curing the optical body 40 or the bonding layer 60 yet to be cured. From such a perspective, the inorganic film preferably is made of any one or multiple types of ITO, $SiO_2$, and $SiN_x$. The thickness of the inorganic film is not particularly restricted, but preferably is more than or equal to 20 nm.

(Activation Treatment)

This treatment is for activating a surface of the inorganic film, and performed for promoting fixing of the mold release agent to the surface of the micro concave-convex structure 32 (that is, the surface of the inorganic film). The activation treatment is not particularly restricted as long as the surface of the inorganic film is activated (that is, fixing of the mold release agent is promoted), and examples thereof include excimer treatment, atmospheric-pressure plasma treatment, corona treatment, oxide ashing treatment, ultraviolet treatment, or the like. Any one or multiple types of these treatments may be performed. Activation treatment preferably is excimer treatment from the perspective of preventing damage to the micro concave-convex structure 41 wherever possible.

(Mold Release Agent Applying Treatment)

A mold release agent is applied to the activated surface of the inorganic film. Examples of the mold release agent include one that contains fluorine resin. The method of application is not particularly restricted, but may be performed with any type of coater (such as a dip coater), for example. Through the above treatment, the mold release treatment is performed on the surface of the micro concave-convex structure 32.

(1-2. Optical Body)

The optical body 40 is a film body to be transferred to the adherend 70, and has the micro concave-convex structure 41 formed in the surface on the transfer body 30 side. The micro concave-convex structure 41 has an inverted shape of the micro concave-convex structure 32 of the transfer body 30, and is fitted in the micro concave-convex structure 32.

Specifically, the micro concave-convex structure 41 has a structure in which concavities and convexities are arranged at an average cycle less than or equal to a visible light wavelength. In other words, the micro concave-convex structure 41 includes large numbers of micro convexities 41*a* and micro concavities 41*b*. The micro convexities 41*a* are portions protruding in the thickness direction of the optical body 40, and the micro concavities 41*b* are portions recessed in the thickness direction of the optical body 40.

The average cycle of the concavities and convexities is less than or equal to a visible light wavelength (for example, less than or equal to 830 nm). The upper limit value of the average cycle preferably is less than or equal to 350 nm, and more preferably is less than or equal to 280 nm. The lower limit value of the average cycle preferably is more than or equal to 100 nm, and more preferably is more than or equal to 150 nm. Consequently, the micro concave-convex structure 41 is what is called a moth-eye structure. The anti-reflection function is achieved by this micro concave-convex structure 41. In a case where the average cycle of the concavities and convexities of the micro concave-convex structure 41 has a value within the above-described range, the anti-reflection function of the micro concave-convex structure 41 is further improved.

Herein, in a case where the average cycle is less than 100 nm, the micro concave-convex structure 41 may be difficult to form. Alternatively, in a case where the average cycle exceeds 350 nm, a phenomenon of diffraction of visible light may occur in the micro concave-convex structure 41.

The average cycle of the micro concave-convex structure 41 is an arithmetic mean value of distances between the micro convexities 41*a*, 41*a* or the micro concavities 41*b*, 41*b* adjacent to each other. The method of observing the micro concave-convex structure 41 and the method of measuring the average cycle are similar to those of the micro concave-convex structure 32.

In addition, the height of concavities/convexities (height of the micro convexities 41a or depth of the micro concavities 41b) is not particularly restricted. For example, the upper limit value of the height of concavities/convexities preferably is less than or equal to 300 nm, and more preferably is less than or equal to 230 nm. For example, the lower limit value of the height of concavities/convexities preferably is more than or equal to 150 nm, and more preferably is more than or equal to 190 nm. In this case, the anti-reflection function of the micro concave-convex structure 41 is further improved.

The arrangement of the micro concave-convex structure 41 is not particularly restricted, but may be a periodic arrangement, or may be a random arrangement. Examples of the periodic arrangement include a staggered lattice arrangement, rectangular lattice arrangement, and the like. In addition, the shape of the micro convexities 41a and the micro concavities 41b is not particularly restricted. The shape of the micro convexities 41a and the micro concavities 41b may be a shell type, pyramidal, columnar, or needle-like, for example. Note that the shape of the micro concavities 41b indicates the shape formed by the inner wall surface of the micro concavities 41b.

The micro concave-convex structure 41 is made of an ultraviolet-curing resin, for example. The ultraviolet-curing resin preferably is transparent. In a case where the micro concave-convex structure 41 is transparent, the micro concave-convex structure 41 can transmit ultraviolet rays for curing the uncured bonding layer 60. From such a perspective, the ultraviolet-curing resin preferably is an ultraviolet-curing acrylic resin or ultraviolet-curing epoxy resin, for example. Specific compositions of the ultraviolet-curing acrylic resin and ultraviolet-curing epoxy resin are similar to those of the micro concave-convex structure 32. Various additives may be added to the resin constituting the micro concave-convex structure 41. The types of additives are similar to those of the micro concave-convex structure 32. In particular, a mold release agent or the like may be added to the resin constituting the micro concave-convex structure 41 such that the transfer body 30 and the optical body 40 can be easily peeled.

In the present embodiment, the initial 90° peeling force when peeling the optical body 40 from the transfer body 30 is less than or equal to 70% of the 90° peeling force between the optical body 40 and the bonding layer 60. Furthermore, the 90° peeling force between the optical body 40 and the covering body 50 preferably is smaller than the 90° peeling force between the optical body 40 and the transfer body 30 including tearing of the optical body 40. Therefore, a resin that satisfies these requirements may be selected from among the resins listed above. For example, since peeling of the optical body 40 involves tearing, it is desirable for the optical body 40 to be solid when being peeled. Thus, a resin may be selected from among the resins or resin mixtures listed above from the perspective that a glass transition temperature after curing is higher than or equal to the temperature at the time of peeling.

(1-3. Covering Body)

The covering body 50 is a film body for protecting the optical body 40, and covers one of the surfaces of the optical body 40 that is located on the side where the transfer body 30 is not provided. The covering body 50 is not necessarily provided on the transfer laminate 20, but from the perspective of protecting the optical body 40, the covering body 50 preferably is provided on the transfer laminate 20. The 90° peeling force between the optical body 40 and the covering body 50 preferably is smaller than the 90° peeling force between the optical body 40 and the transfer body 30 including tearing of the optical body 40. Therefore, the covering body 50 is made of a material that satisfies these requirements. For example, the covering body 50 may be made of a common protect film obtained by applying polyethylene-vinyl acetate onto a low-density polyethylene film. Note that the transfer body 30 may be used instead of the covering body 50. In this case, the micro concave-convex structures 41 will be formed on both the surfaces of the optical body 40. In the case where the micro concave-convex structures 41 are formed on both the surfaces of the optical body 40, further improvement of the anti-reflection function of the optical body 40 can be expected. Furthermore, since the micro concave-convex structure 41 is also formed on the surface bonded to the bonding layer 60, improvement of the 90° peeling force between the bonding layer 60 and the optical body 40 by virtue of the anchor effect can also be expected.

<2. Configuration of Optical Laminate>

Next, a configuration of the optical laminate 10 will be described with reference to FIG. 2. The optical laminate 10 includes the adherend 70, the bonding layer 60, and the optical body 40.

The adherend 70 is provided with the anti-reflection function achieved by the optical body 40. The type of the adherend 70 is not particularly limited, but may be any type as long as the anti-reflection function is obtained. As an example, the adherend 70 may be a substrate constituting an electronic apparatus such as a smartphone, various displays, or various imaging devices. More specifically, the adherend 70 may be a substrate constituting the front surface of a smartphone, for example. In this case, the optical body 40 is formed in a transparent region constituting a camera hole. The specific material of the adherend 70 may be a glass substrate, a glass substrate whose surface is covered by polyimide or the like, a polymethylmethacrylate (PMMA) substrate, or the like, for example.

The bonding layer 60 is transparent, and bonds the optical body 40 to the adherend 70. The bonding layer 60 is made of an ultraviolet-curing resin, for example, and more specifically, an ultraviolet-curing acrylic resin or ultraviolet-curing epoxy resin. The specific compositions of the ultraviolet-curing acrylic resin and ultraviolet-curing epoxy resin are similar to those of the micro concave-convex structure 32. Herein, in the present embodiment, the initial 90° peeling force when peeling the optical body 40 from the transfer body 30 is less than or equal to 70% of the 90° peeling force between the optical body 40 and the bonding layer 60. Therefore, a resin that satisfies these requirements may be selected from among the resins listed above. For example, in a case of transferring the optical body 40 onto a glass substrate, the bonding layer 60 may be formed using a resin that can ensure a sufficient adhesion force with glass. In addition, from the perspective of holding the optical body 40, it is desirable to keep a sufficient hardness in a use temperature region, and the bonding layer 60 has a storage elastic modulus of preferably more than or equal to 1 MPa, and more preferably more than or equal to 100 MPa. The resin of the bonding layer 60 may be selected from such a perspective.

The optical body 40 is peeled from the transfer laminate 20. Herein, in the present embodiment, the initial 90° peeling force when peeling the optical body 40 from the transfer body 30 is less than or equal to 70% of the 90° peeling force between the optical body 40 and the bonding layer 60. Thus, the optical body 40 can be transferred to at least part of the adherend 70 with high accuracy. Herein, the 90° peeling force between the optical body 40 and the bonding layer 60 preferably is more than or equal to 13 N/25 mm. In this case, the initial 90° peeling force when peeling the optical body 40 from the transfer body 30 can be made less than or equal to 70% of the 90° peeling force between the optical body 40 and the bonding layer 60 more reliably.

Herein, the total thickness of the bonding layer 60 and the optical body 40 preferably is less than or equal to 15 μm, and more preferably is less than or equal to 10 μm, and still more preferably is less than or equal to 5 μm. Accordingly, an electronic apparatus including the adherend 70 can be reduced in size and thickness. Herein, the total thickness of the bonding layer 60 and the optical body 40 is the distance in the thickness direction from the upper ends (top ends) of the micro convexities 41a of the micro concave-convex structure 41 to the lower end surface of the bonding layer 60 (the surface in contact with the adherend 70). Since the distance somewhat varies depending on a measurement point, an arithmetic mean value of values measured at some measurement points may be determined as the total thickness.

Since the optical body 40 achieves the anti-reflection function by virtue of the micro concave-convex structure 41, the optical body 40 can be reduced in thickness. For example, the thickness of the portion of the optical body 40 where the micro concave-convex structure 41 is not formed can also be made less than or equal to 1 μm. In a case where the bonding layer 60 is an ultraviolet-curing resin, for example, the thickness of the bonding layer 60 is extremely small. Consequently, by making the bonding layer 60 of an ultraviolet-curing resin, the total thickness of the bonding layer 60 and the optical body 40 can easily be a value within the above-described range.

<3. As to Peeling Force>

Herein, various peeling forces defined in the present embodiment will be described with reference to FIG. 2 to FIG. 4. Although details will be described later, the optical laminate 10 is produced generally through the following steps. In other words, first, part of the covering body 50 is peeled from the transfer laminate 20. Part of the optical body 40 is thereby exposed. On the other hand, the uncured bonding layer 60 is formed on (for example, an adhesive agent is applied to) a portion of the surface of the adherend 70 where the optical body 40 is formed. Then, the transfer laminate 20 is pressed against the adherend 70 such that the exposed surface of the optical body 40 is brought into contact with the uncured bonding layer 60. Then, the uncured bonding layer 60 is cured. Then, the transfer laminate 20 is peeled from the adherend 70. On this occasion, only the portion of the optical body 40 bonded by the bonding layer 60 is transferred to the adherend 70 side, and the remaining portion remains on the transfer body 30. Part of the optical body 40 is thereby peeled from the transfer body 30.

Figure 3:
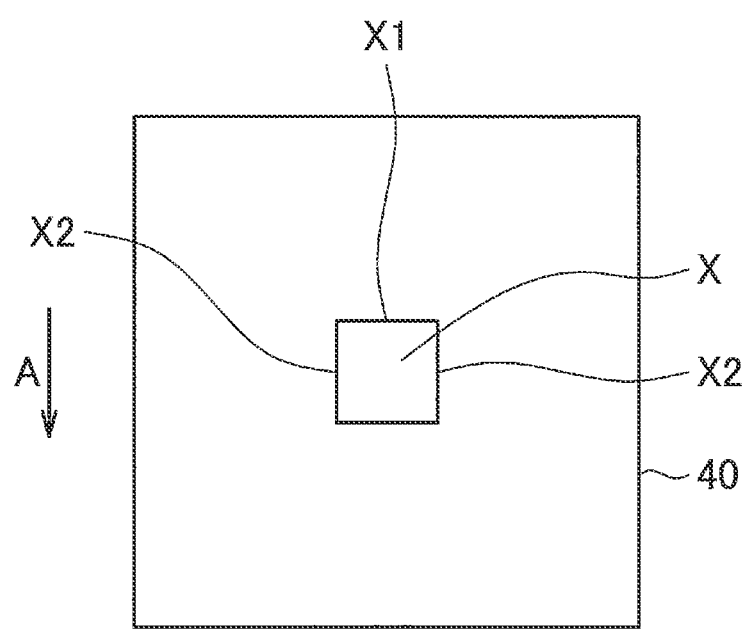
FIG. 3 is a plan view for describing an initial 90° peeling force and a 90° peeling force including tearing according to the embodiment.

FIG. 3 illustrates the exposed surface of the optical body 40. A region X indicates the portion peeled from the transfer body 30, and an arrow A indicates the direction in which the transfer laminate 20 is peeled from the adherend 70. When the transfer laminate 20 is peeled from the adherend 70, then, in the region X, the optical body 40 is first peeled from the transfer body 30, while a boundary surface X1 is cut. In other words, the peeling force on this occasion is obtained by adding a tensile breaking stress necessary for breaking the boundary surface X1 to a binding force achieved by the anchor effect between the optical body 40 and the transfer body 30. The 90° peeling force at this time is defined as an initial 90° peeling force. More specifically, in a case of performing a 90° peel test on the optical body 40 and the transfer body 30 with an adhesion width of 25 mm (a sample width is wider than 25 mm) and at a pull-up speed of 200 mm/min, a value at which the magnitude of the 90° peeling force (N/25 mm) is maximized in the first place is defined as the "initial 90° peeling force when peeling the optical body 40 from the transfer body 30".

Figure 4:
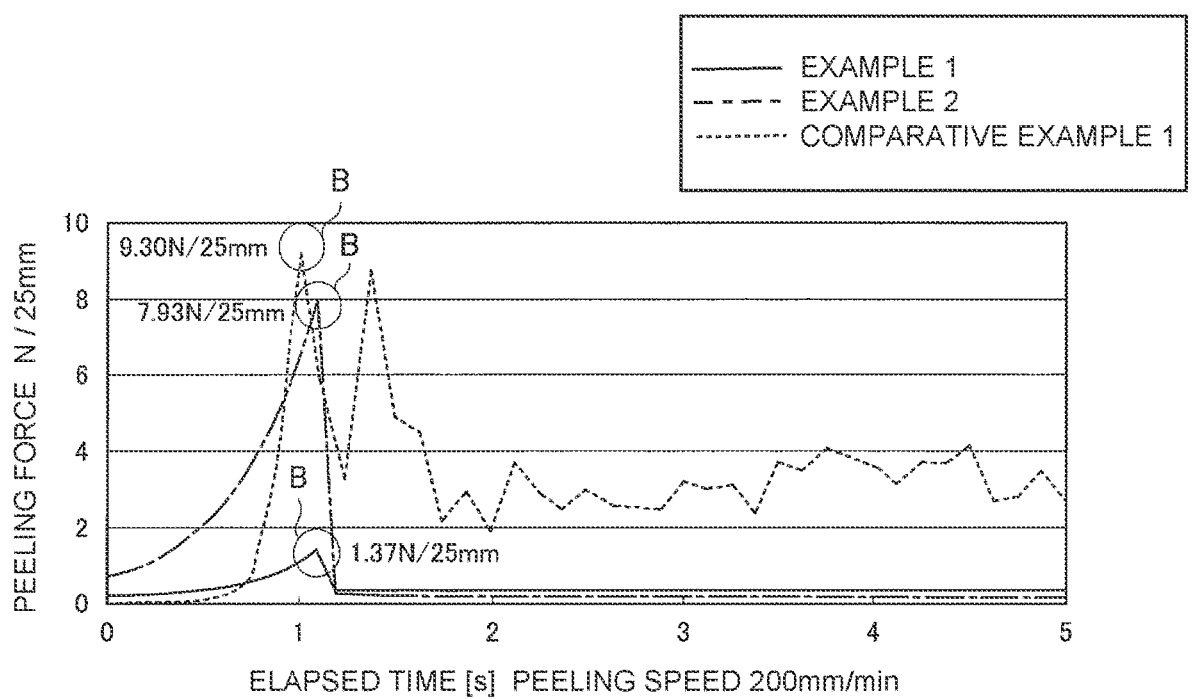
FIG. 4 is a graph illustrating time changes of 90° peeling forces according to the embodiment.

FIG. 4 illustrates an example of results of the 900 peel test. The 90° peeling force indicated by a region B is the initial 90° peeling force. When the transfer laminate 20 is further peeled from the adherend 70, the optical body 40 is peeled from the transfer body 30 while a boundary surface X2 is broken. The peeling force on this occasion is obtained by adding a tearing stress necessary for breaking the boundary surface X2 to a binding force achieved by the anchor effect between the optical body 40 and the transfer body 30. The peeling force at this time is defined as the "90° peeling force between the optical body 40 and the transfer body 30 including tearing of the optical body 40". More specifically, in a case of performing the above-described 900 peel test, the arithmetic mean value of the initial 90° peeling force and subsequent peeling forces is defined as the "90° peeling force between the optical body 40 and the transfer body 30 including tearing of the optical body 40".

Other peeling forces are general 90° peeling forces not including the tensile breaking stress and tearing stress described above. In other words, they are 900 peeling forces obtained when performing the 900 peel test with an adhesion width of 25 mm (the same as the sample width) and at a pull-up speed of 200 mm/min. The inventor of the present invention has found out that, in a case where these peeling forces satisfy the above-described requirements, the optical body 40 is transferred to the adherend 70 with high accuracy (such that a transfer failure or the like, for example, does not occur).

<4. Method for Manufacturing Transfer Body>

Next, a method for manufacturing the transfer body 30 will be described with reference to FIG. 5 to FIG. 7. The transfer body 30 can be produced by what is called a roll-to-roll method.

(4-1-1. Configuration of Master)

Figure 5:
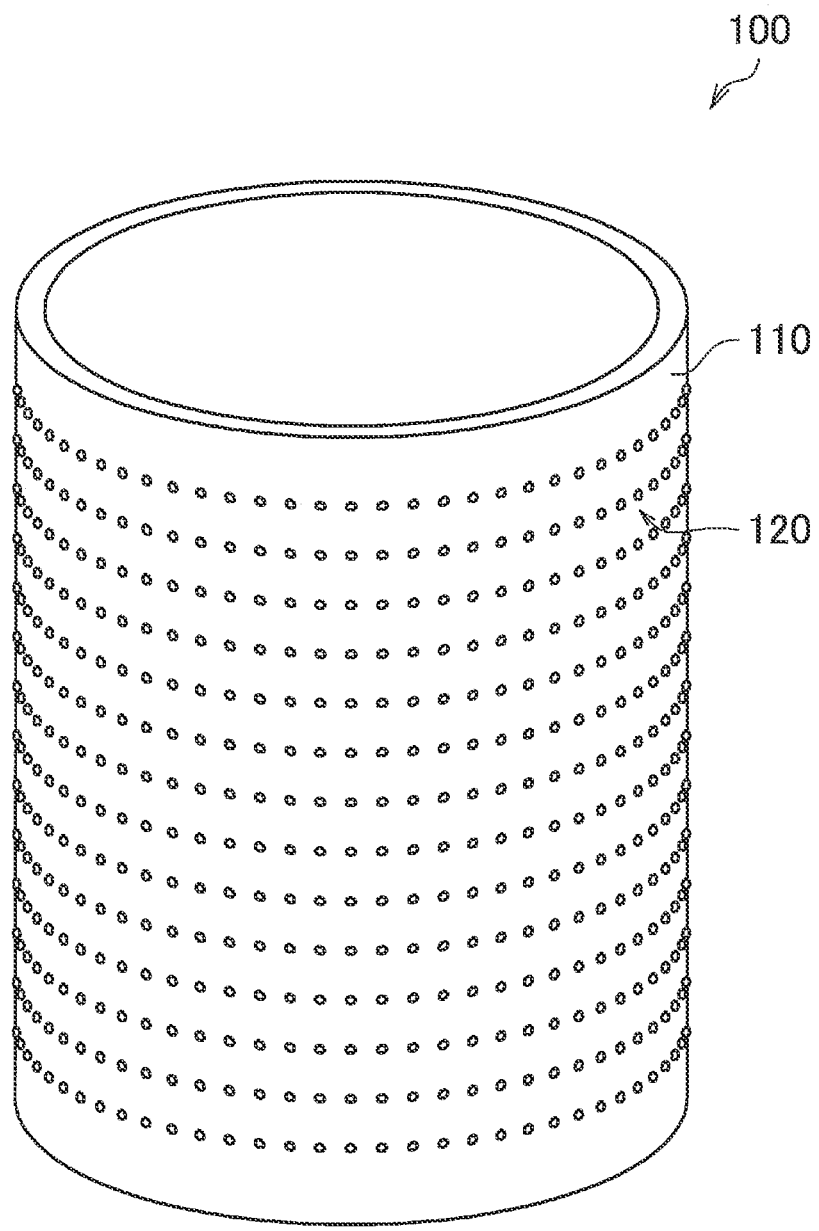
FIG. 5 is a perspective view illustrating an exemplary appearance of a master according to the embodiment.

FIG. 5 illustrates a configuration of the master 100 for producing the transfer body 30. The master 100 has a cylindrical shape. The master 100 may also have a round columnar shape, or another shape (for example, a planar shape). However, in the case where the master 100 has a round columnar or cylindrical shape, a concave-convex structure (that is, a master concave-convex structure) 120 of the master 100 can be transferred seamlessly to a resin base material or the like by a roll-to-roll method. The micro concave-convex structure 32 can thereby be formed in the surface of the base material film 31 with high production efficiency. From such a perspective, the shape of the master 100 preferably is a cylindrical shape or a round columnar shape.

The master 100 includes a master base material 110 and the master concave-convex structure 120 formed in the circumferential surface of the master base material 110. The master base material 110 is a glass body, for example, and specifically is formed from quartz glass. However, the master base material 110 is not particularly limited insofar as the $SiO_2$ purity is high, and may also be formed from a material such as fused quartz glass or synthetic quartz glass. The master base material 110 may also be a laminate of the above materials on a metal matrix, or a metal matrix (for example, Cu, Ni, Cr, Al). The shape of the master base material 110 is a cylindrical shape, but may also be a round columnar shape, or another shape. However, as described above, the master base material 110 preferably has a cylindrical shape or a round columnar shape. The master concave-convex structure 120 has an inverted structure of the micro concave-convex structure 32.

(4-1-2. Method for Manufacturing Master)

Next, a method for manufacturing the master 100 will be described. First, a base material resist layer is formed (deposited) on the master base material 110. Herein, the resist material constituting the base material resist layer is not particularly restricted, and may be either an organic resist material or an inorganic resist material. Examples of organic resist materials include novolac-type resist and chemically-amplified resist. In addition, examples of inorganic resist materials include metallic oxides including one or multiple types of transition metals such as tungsten (W) or molybdenum (Mo). Other examples of inorganic resist materials include Cr, Au, and the like. However, in order to conduct thermal reaction lithography, the base material resist layer preferably is formed from a thermo-reactive resist including a metallic oxide.

In the case of using an organic resist material for the base material resist layer, the base material resist layer may be formed on the master base material 110 by using a process such as spin coating, slit coating, dip coating, spray coating, or screen printing. Alternatively, in the case of using an inorganic resist material for the base material resist layer, the base material resist layer may be formed using sputtering. An organic resist material and an inorganic resist material may also be used in combination.

Next, by exposing part of the base material resist layer with an exposure device 200 (see FIG. 6), a latent image is formed on the base material resist layer. Specifically, the exposure device 200 modulates laser light 200A, and irradiates the base material resist layer with the laser light 200A. Consequently, part of the base material resist layer irradiated with the laser light 200A denatures, and thus a latent image corresponding to the master concave-convex structure 120 can be formed in the base material resist layer.

Next, by dripping a developing solution onto the base material resist layer in which the latent image has been formed, the base material resist layer is developed. A concave-convex structure is thereby formed in the base material resist layer. Subsequently, by etching the master base material 110 and the base material resist layer using the base material resist layer as a mask, the master concave-convex structure 120 is formed on the master base material 110. Note that although the etching method is not particularly restricted, dry etching that is vertically anisotropic is preferable. For example, reactive ion etching (RIE) is preferable. Through the above steps, the master 100 is produced. The etching may be wet etching.

(4-1-3. Configuration of Exposure Device)

Next, the configuration of the exposure device 200 will be described with reference to FIG. 6. The exposure device 200 is a device that exposes the base material resist layer. The exposure device 200 includes a laser light source 201, a first mirror 203, a photodiode (PD) 205, a deflecting optical system, a control mechanism 230, a second mirror 213, a movable optical table 220, a spindle motor 225, and a turntable 227. In addition, the master base material 110 is placed on the turntable 227 and is capable of rotating.

The laser light source 201 is a light source that emits the laser light 200A, and is a device such as a solid-state laser or a semiconductor laser, for example. The wavelength of the laser light 200A emitted by the laser light source 201 is not particularly limited, but may be a wavelength in the blue light band from 400 nm to 500 nm, for example. In addition, it is sufficient for the spot diameter of the laser light 200A (the diameter of the spot radiated onto the resist layer) to be smaller than the diameter of the open face of a concavity of the master concave-convex structure 120, such as approximately 200 nm, for example. The laser light 200A emitted from the laser light source 201 is controlled by the control mechanism 230.

The laser light 200A emitted from the laser light source 201 advances directly in a collimated beam, reflects off the first mirror 203, and is guided to the deflecting optical system.

The first mirror 203 is made up of a polarizing beam splitter, and has a function of reflecting one polarized component, and transmitting the other polarized component. The polarized component transmitted through the first mirror 203 is detected by the photodiode 205 and photoelectrically converted. In addition, a photodetection signal photoelectrically converted by the photodiode 205 is input into the laser light source 201, and the laser light source 201 conducts phase modulation of the laser light 200A on the basis of the input photodetection signal.

In addition, the deflecting optical system includes a condenser lens 207, an electro-optic deflector (EOD) 209, and a collimator lens 211.

In the deflecting optical system, the laser light 200A is condensed onto the electro-optic deflector 209 by the condenser lens 207. The electro-optic deflector 209 is an element capable of controlling the radiation position of the laser light 200A. With the electro-optic deflector 209, the exposure device 200 is also capable of changing the radiation position of the laser light 200A guided onto the movable optical table 220 (what is called a Wobble mechanism). After the radiation position is adjusted by the electro-optic deflector 209, the laser light 200A is converted back into a collimated beam by the collimator lens 211. The laser light 200A exiting the deflecting optical system is reflected by the second mirror 213, and guided level with and parallel to the movable optical table 220.

The movable optical table 220 includes a beam expander (BEX) 221 and an objective lens 223. The laser light 200A guided to the movable optical table 220 is shaped into a desired beam shape by the beam expander 221, and then radiated via the objective lens 223 onto the base material resist layer formed on the master base material 110. In addition, the movable optical table 220 moves by one feed pitch (track pitch) in the direction of the arrow R (feed pitch direction) every time the master base material 110 undergoes one rotation. The master base material 110 is placed on the turntable 227. The spindle motor 225 causes the turntable 227 to rotate, thereby causing the master base material 110 to rotate. Accordingly, the laser light 200A is made to scan over the base material resist layer. Herein, a latent image of the base material resist layer is formed along the scanning direction of the laser light 200A.

In addition, the control mechanism 230 includes a formatter 231 and a driver 233, and controls the irradiation with the laser light 200A. The formatter 231 generates a modulation signal that controls the irradiation with the laser light 200A, and the driver 233 controls the laser light source 201 on the basis of the modulation signal generated by the formatter 231. The irradiation of the master base material 110 with the laser light 200A is thereby controlled.

The formatter 231 generates a control signal for irradiating the base material resist layer with the laser light 200A, on the basis of an input image depicting an arbitrary pattern to be drawn on the base material resist layer. Specifically, first, the formatter 231 acquires an input image depicting an arbitrary draw pattern to be drawn on the base material resist layer. The input image is an image corresponding to a development view of the outer circumferential surface of the base material resist layer, in which the outer circumferential surface of the base material resist layer is cut in the axial direction and expanded in a single plane. In this development view, an image corresponding to the circumferential shape of the master 100 is drawn. This image illustrates the inverted structure of the micro concave-convex structure 32. Note that a transfer film to which the master concave-convex structure 120 of the master 100 has been transferred may be produced, and the micro concave-convex structure 32 may be formed on the base material film 31 using this transfer film as a transfer mold. In this case, the master concave-convex structure 120 has the same concave-convex structure as the micro concave-convex structure 32.

Next, the formatter 231 partitions the input image into sub-regions of a predetermined size (for example, partitions the input image into a lattice), and determines whether or not the concavity draw pattern (in other words, a pattern corresponding to the concavities of the master 100) is included in each of the sub-regions. Subsequently, the formatter 231 generates a control signal to perform control to irradiate with the laser light 200A each sub-region determined to include the concavity draw pattern. This control signal (that is, the exposure signal) preferably is synchronized with the rotation of the spindle motor 225, but does not have to be synchronized. In addition, the control signal and the rotation of the spindle motor 225 may also be resynchronized every time the master base material 110 performs one rotation. Furthermore, the driver 233 controls the output of the laser light source 201 on the basis of the control signal generated by the formatter 231. The irradiation of the base material resist layer with the laser light 200A is thereby controlled. Note that the exposure device 200 may also perform a known exposure control process, such as focus servo and positional correction of the irradiation spot of the laser light 200A. The focus servo may use the wavelength of the laser light 200A, or use another wavelength for reference.

In addition, the laser light 200A radiated from the laser light source 201 may be radiated onto the base material resist layer after being split into multiple optical systems. In this case, multiple irradiation spots are formed on the base material resist layer. In this case, exposure may be terminated when the laser light 200A emitted from one optical system reaches the latent image formed by another optical system.

Consequently, according to the present embodiment, a latent image corresponding to the draw pattern of the input image can be formed in the resist layer. Then, by developing the resist layer and using the developed resist layer as a mask to etch the master base material 110 and the base material resist layer, the master concave-convex structure 120 corresponding to the draw pattern of the input image is formed on the master base material 110. In other words, an arbitrary master concave-convex structure 120 corresponding to a draw pattern can be formed. Consequently, if a draw pattern in which the inverted structure of the micro concave-convex structure 32 is drawn is prepared as the draw pattern, the master concave-convex structure 120 having the inverted structure of the micro concave-convex structure 32 can be formed.

Figure 6:
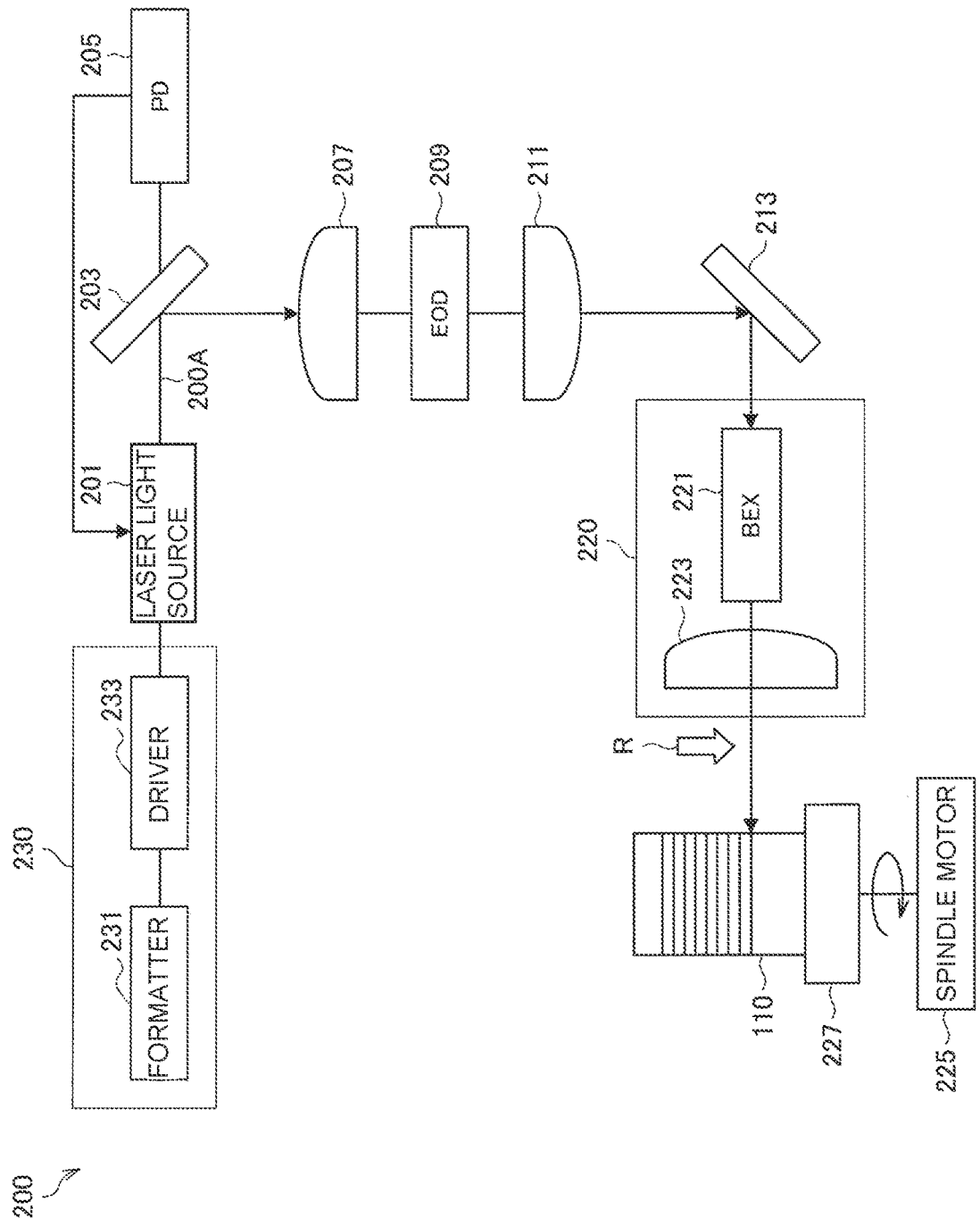
FIG. 6 is a block diagram illustrating an exemplary configuration of an exposure device according to the embodiment.
Figure 7:
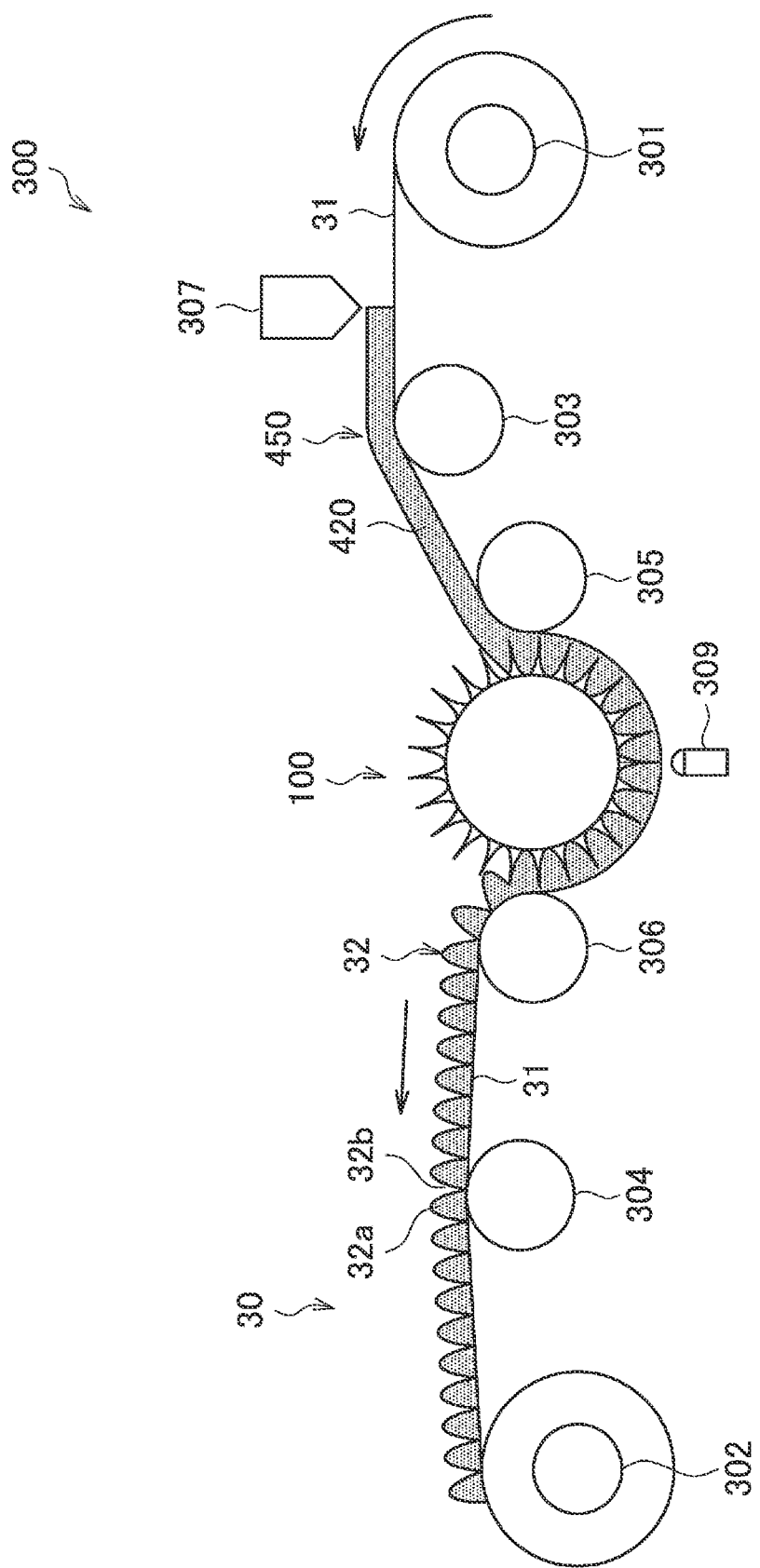
FIG. 7 is a schematic diagram illustrating an example of a transfer device that manufactures a transfer body according to the embodiment by roll-to-roll.

Note that the exposure device usable in the present embodiment is not restricted to the exemplary configuration of the exposure device 200 illustrated in FIG. 6, and any type of exposure device having functions similar to those of the exposure device 200 may be used.

(4-1-4. Method for Forming Transfer Body Using Master)

Next, an example of a method for forming the transfer body 30 using the master 100 will be described with reference to FIG. 7. The transfer body 30 can be formed by a roll-to-roll transfer device 300 using the master 100. Note that in this example, the resin constituting the micro concave-convex structure 41 is an ultraviolet-curing resin.

The transfer device 300 includes the master 100, a base material supply roll 301, a take-up roll 302, guide rolls 303 and 304, a nip roll 305, a separation roll 306, an applicator device 307, and a light source 309.

The base material supply roll 301 is a roll around which the long-length base material film 31 is wound in a roll, while the take-up roll 302 is a roll that takes up the transfer body 30. In addition, the guide rolls 303 and 304 are rolls that transport the base material film 31. The nip roll 305 is a roll that puts the base material film 31 on which an uncured resin layer 420 has been laminated, or in other words a transfer film 450, in close contact with the master 100. The separation roll 306 is a roll that separates the transfer body 30 from the master 100.

The applicator device 307 includes applicator means such as a coater, and applies an uncured curing resin to the base material film 31, and forms the uncured resin layer 420. The applicator device 307 may be a device such as a gravure coater, a wire bar coater, or a die coater, for example. In addition, the light source 309 is a light source that emits light of a wavelength at which the uncured resin can be cured, and may be a device such as an ultraviolet lamp, for example.

In the transfer device 300, first, the base material film 31 is delivered continuously from the base material supply roll 301 via the guide roll 303. Note that partway through the delivery, the base material supply roll 301 may also be changed to a base material supply roll 301 of a separate lot. The uncured resin is applied by the applicator device 307 to the delivered base material film 31, and the uncured resin layer 420 is laminated onto the base material film 31. The transfer film 450 is thereby produced. The transfer film 450 is brought into close contact with the master 100 by the nip roll 305. The light source 309 irradiates with ultraviolet rays the uncured resin layer 420 in close contact with the master 100, thereby curing the uncured resin layer 420. The master concave-convex structure 120 of the master 100 is thereby transferred to the resin layer 425. In other words, the micro concave-convex structure 32 is formed in the surface of the base material film 31. Next, the base material film 31 in which the micro concave-convex structure 32 has been formed is separated from the master 100 by the separation roll 306. Next, the base material film 31 in which the micro concave-convex structure 32 has been formed is taken up by the take-up roll 302 via the guide roll 304. Note that the master 100 may be oriented vertically or oriented horizontally, and a mechanism that corrects the angle and eccentricity of the master 100 during rotation may also be provided separately. For example, an eccentric tilt mechanism may be provided in a chucking mechanism. The transfer may also be performed by pressure transfer.

In this way, in the transfer device 300, the circumferential shape of the master 100 is transferred to the transfer film 450 while transporting the transfer film 450 roll-to-roll. The micro concave-convex structure 32 is thereby formed on the base material film 31.

Note that in the case of using a thermoplastic resin film as the base material film 31, the applicator device 307 and the light source 309 become unnecessary. In this case, a heater device is disposed farther upstream than the master 100. The base material film 31 is heated and softened by this heater device, and thereafter, the base material film 31 is pressed against the master 100. Accordingly, the master concave-convex structure 120 formed on the circumferential surface of the master 100 is transferred to the base material film 31. Note that a film including a resin other than a thermoplastic resin may be used as the base material film 31, and the base material film 31 and a thermoplastic resin film may be laminated. In this case, the laminated film is pressed against the master 100 after being heated by the heater device. Consequently, the transfer device 300 is capable of continuously producing a transfer product in which the micro concave-convex structure 32 has been formed on the base material film 31. Obviously, the method for manufacturing the transfer body 30 is not limited to the above-described example, but any method that can manufacture the transfer body 30 may be adopted.

<5. Method for Manufacturing Transfer Laminate 20>

Next, a method for manufacturing the transfer laminate 20 will be described with reference to FIG. 1. First, an uncured resin (to be the optical body 40 after curing) is applied onto the micro concave-convex structure 32 of the transfer body 30 produced above. Then, the covering body 50 prepared separately is compressed onto the uncured resin layer. The method of compression is not particularly limited, but examples thereof include compression by means of a roll laminator or the like. By adjusting the pressure during compression, the thickness of the optical body 40 can be adjusted. Then, the uncured resin layer is cured. In a case where the uncured resin is an ultraviolet-curing resin, for example, the transfer body 30 is irradiated with ultraviolet rays from the outside, for example. The uncured resin layer is thereby cured, and the optical body 40 is formed. Through the above steps, the transfer laminate 20 is produced.

<6. Method for Manufacturing Optical Laminate 10>

Next, a method for manufacturing the optical laminate 10 will be described with reference to FIG. 1 and FIG. 2. First, part of the covering body 50 is peeled from the transfer laminate 20. Part of the optical body 40 is thereby exposed. Herein, in a case where the 90° peeling force between the optical body 40 and the covering body 50 is smaller than the 90° peeling force between the optical body 40 and the transfer body 30 including tearing of the optical body 40, the covering body 50 can be peeled from the optical body 40 with higher accuracy. Specifically, the optical body 40 can be restrained from moving to the peeled covering body 50.

On the other hand, the uncured bonding layer 60 is formed on (for example, an adhesive agent is applied to) a portion of the surface of the adherend 70 where the optical body 40 is formed. Herein, by making the uncured bonding layer 60 of an ultraviolet-curing resin, the bonding layer 60 after curing can be reduced in thickness. Then, the transfer laminate 20 is pressed against the adherend 70 such that the exposed surface of the optical body 40 is brought into contact with the uncured bonding layer 60. Then, the uncured bonding layer 60 is cured. In the case where the uncured bonding layer 60 is an ultraviolet-curing resin, the transfer body 30 may be irradiated with ultraviolet rays from the outside, for example. The uncured resin layer is thereby cured, and the bonding layer 60 is formed. Then, the transfer laminate 20 is peeled from the adherend 70. On this occasion, only a portion of the optical body 40 bonded by the bonding layer 60 is transferred to the adherend 70 side, and the remaining portion remains on the transfer body 30. Part of the optical body 40 is thereby peeled from the transfer body 30. Herein, in the present embodiment, the initial 90° peeling force when peeling the optical body 40 from the transfer body 30 is adjusted to be less than or equal to 70% of the 90° peeling force between the optical body 40 and the bonding layer 60. Thus, the optical body 40 can be transferred to at least part of the adherend 70 with high accuracy. For example, a transfer failure in which the portion of the optical body 40 brought into contact with the bonding layer 60 remains on the transfer body 30, or the like can be restrained. The optical body 40 can thereby be transferred partially to the adherend 70 while maintaining a state in which few foreign objects are incorporated. Through the above steps, the optical laminate 10 is produced.

From the foregoing, the present embodiment enables the optical body 40 to be transferred to the adherend 70 with high accuracy (such that a transfer failure or the like, for example, does not occur). In addition, by forming the optical body 40 in advance, flexibility in selecting a resin constituting the optical body 40 or the bonding layer 60 can be increased as compared with a direct forming method. Herein, the direct forming method is a method for directly forming the optical body 40 on the adherend 70 by forming an uncured resin layer on the adherend 70 and curing the resin layer in a state where the micro concave-convex structure 32 of the transfer body 30 is pressed against this resin layer. In the direct forming method, the bonding layer 60 and the optical body 40 are formed from the same resin (substantially, a single layer of the optical body 40 is formed), whilst in the present embodiment, the bonding layer 60 and the optical body 40 can be formed from different resins (obviously, may also be formed from the same resin). Furthermore, even if the resin constituting the optical body 40 is not excellent in adhesiveness with the adherend 70, the optical laminate 10 that satisfies the requirements of the present embodiment can be produced by forming the bonding layer 60 from a resin excellent in adhesiveness with the optical body 40 and the adherend 70. Furthermore, in the direct forming method, a resin needs to be charged into the micro concave-convex structure 32 when forming the optical body 40, which requires a high pressure. Consequently, in a case where the adherend 70 has a weak strength, a sufficient pressure cannot be applied, so that favorable transfer cannot be achieved. Favorable transfer may be achieved in a case where the aforementioned uncured resin layer is reduced in viscosity. In this case, however, it is difficult to control the transfer range of the optical body 40, that is, the degree of spread of resin since the uncured resin layer has a low viscosity. In this manner, in the present embodiment, the optical laminate 10 having a stable quality can be produced with industrially high accuracy.

EXAMPLES

1. Example 1

Next, examples of the present embodiment will be described. In Examples 1, 2 and Comparative Example 1 which will be described later, the initial 90° peeling force was studied.

Note that, in Example 1 and each of the following examples, various peeling forces will be described referring to the transfer body as "A", the optical body as "B", the covering body as "C", and the bonding layer as "D". For example, the initial 90° peeling force when peeling the optical body from the transfer body will also be referred to as an "A-B initial 90° peeling force". The 90° peeling force between the optical body and the bonding layer will also be referred to as a "B-D 90° peeling force". The 90° peeling force between the optical body and the transfer body including tearing of the optical body will also be referred to as an "A-B 90° peeling force including tearing of B". The 90° peeling force between the optical body and the covering body will also be referred to as a "B-C 90° peeling force".

(1-1. Preparation of Test Sample)

First, a PET film (specifically, A4100 made by TOYOBO CO., LTD.) having a thickness of 125 μm was prepared as a base material film, and UVX01 (an ultraviolet-curing resin obtained by mixing "UVX6366" made by TOAGOSEI CO., LTD. and "M240" made by TOAGOSEI CO., LTD. in a mass ratio of 6:4 to which 2% by mass of "Irgacure 184" made by BASF has been added as a curing initiator) was prepared as a resin for the micro concave-convex structure. Then, a transfer body was produced in accordance with the method for manufacturing a transfer body described above. Herein, the track-to-track distance (track pitch) of the micro concave-convex structure was 153 nm, the intra-track distance (dot pitch) was 230 nm, and the height of concavities/convexities was 225 nm on average (an arithmetic mean value of a plurality of heights of concavities/convexities).

Then, the mold release treatment described above was performed on the micro concave-convex structure of the transfer body. First, an inorganic film made of ITO was formed by sputtering on the micro concave-convex structure to a thickness of 20 nm. Then, excimer treatment was performed to activate the inorganic film. Then, fluorine resin (Novec1720 made by 3M Company) to serve as a mold release agent was applied to the surface of the inorganic film with the benchtop dip coater "DT-0502-S1" made by SDI Company., Ltd. The pull-up speed was 1 mm/sec.

Then, A05 (an ultraviolet-curing resin obtained by mixing "UVX6366" made by TOAGOSEI CO., LTD., "VISCOAT #150" made by OSAKA ORGANIC CHEMICAL INDUSTRY LTD., and "Miramer M200" made by Miwon Specialty Chemical Co., Ltd. in a mass ratio of 5:3:2 to which 2% by mass of "Irgacure 184" made by BASF has been added as a curing initiator) was applied onto the micro concave-convex structure of the transfer body as a resin for the optical body to a thickness of 1 μm. Herein, an applied thickness was a value not including the height of the concavities/convexities of the micro concave-convex structure 41. Then, by irradiating the resin layer with ultraviolet rays, the resin layer was cured. A laminate (test sample) of the transfer body and the optical body was thereby produced.

(1-2. A-B 90° Peel Test)

Then, the optical body on the transfer body was subjected to the A-B 90° peel test. The A-B 90° peel test was performed with a testing machine ("Tension and compression testing machine SV-55C-2H" made by IMADA S-S Corporation) conforming to JIS-6854-1. Furthermore, in order to correctly measure the initial 90° peeling force, a data logger ("midi LOGGER GL200" made by GRAPHTEC Corporation) was connected to the testing machine. The A-B 90° peel test was performed under test conditions in which the adhesion width was 25 mm, the test length was more than or equal to 150 mm, and the pull-up speed was 200 mm/min. The width of the test sample was made wider than 25 mm. A result is illustrated in FIG. 4. As illustrated in FIG. 4, the A-B initial 90° peeling force was 1.37 N/25 mm. In addition, the A-B 90° peeling force including tearing was 0.27 N/25 mm. This value was used in Examples 3, 4 and Comparative examples 2, 3 which will be described later.

(1-3. B-D 90° Peel Test)

Then, a slide glass was prepared as an adherend, and "ARONIX UVX5800" made by TOAGOSEI CO., LTD. was prepared as an adhesive agent for the bonding layer. On the other hand, the optical body was peeled from the transfer body to prepare a single optical body. Then, the adhesive agent was applied to the adherend, and the optical body was laminated on the applied surface. Then, the adhesive agent was cured. The thickness of the bonding layer after curing was 5 μm. This test sample was subjected to the B-D 90° peel test. The testing machine was similar to that described above, and test conditions were such that the adhesion width was 25 mm, the test length was more than or equal to 150 mm, and the pull-up speed was 200 mm/min. The width of the test sample was agreed to 25 mm. As a result, the B-D 90° peeling force was 13.0 N/25 mm in Example 1. Consequently, the A-B initial 90° peeling force (=1.37 N/25 mm) was 10.5% of the B-D 90° peeling force (=13.0 N/25 mm).

(1-4. Transfer Test)

Then, an adhesive agent was applied to the adherend, and a laminate of the transfer body and the optical body was laminated on the applied surface. Then, the adhesive agent was cured. The thickness of the bonding layer after curing was 5 μm. Then, an operator peeled the laminate. As a result, only the portion of the optical body arranged on the bonding layer was transferred to the adherend, and the remaining portion was peeled from the adherend together with the transfer body. Consequently, it was possible to transfer the optical body to at least part of the adherend with high accuracy.

2. Example 2

A test similar to that of Example 1 was performed except that an Si film having a thickness of 20 μm was used as the base material film, the applied thickness when producing the optical body was 1.5 μm, and "ARONIX LCR0632" made by TOAGOSEI CO., LTD. was used as the adhesive agent for the bonding layer. As a result, the A-B initial 90° peeling force was 7.93 N/25 mm, and the B-D 90° peeling force was 11.8 N/25 mm. FIG. 4 illustrates a result of the A-B 90° peel test. Consequently, in Example 2, the A-B initial 90° peeling force (=7.93 N/25 mm) was 67.2% of the B-D 90° peeling force (=11.8 N/25 mm). In the transfer test, a result similar to that of Example 1 was obtained.

3. Comparative Example 1

A PET film (specifically, "A4100" made by TOYOBO CO., LTD.) having a thickness of 125 μm was used as the base material film, and "SK1120" made by Dexerials Corporation was used as a resin for the micro concave-convex structure of the transfer body. Furthermore, the track-to-track distance (track pitch) of the micro concave-convex structure of the transfer body was 153 nm, the intra-track distance (dot pitch) was 230 nm, and the height of concavities/convexities was 225 nm on average. The resin for the optical body was UVX2 (an ultraviolet-curing resin obtained by mixing "UVX6366" made by TOAGOSEI CO., LTD., "VISCOAT #150" made by OSAKA ORGANIC CHEMICAL INDUSTRY LTD., and "MiramerM200" made by Miwon Specialty Chemical Co., Ltd. in a mass ratio of 6:2:2 to which 2% by mass of "Irgacure 184" made by BASF has been added as a curing initiator), and the applied thickness when producing the optical body was 4.0 μm. Furthermore, oxide tungsten was sputtered on the micro concave-convex structure of the transfer body, while mold release treatment was not performed. Except these facts, processing similar to that of Example 1 was performed. As a result, the A-B initial 90° peeling force was 9.30 N/25 mm, and the B-D 90° peeling force was 13.0 N/25 mm. A result of the A-B 90° peel test is illustrated in FIG. 4. Consequently, in Comparative Example 1, the A-B initial 90° peeling force (=9.30 N/25 mm) was 71.5% of the B-D 90° peeling force (=13.0 N/25 mm). In the transfer test, the optical body was not transferred to the bonding layer, but the whole optical body remained on the transfer body. The results of Examples 1, 2 and Comparative Example 1 are collectively shown in Table 1

TABLE 1

| | A-B initial 90° peeling force X (N/25 mm) | B-D peeling force Y (N/25 mm) | X/Y (%) | Result of transfer test |
|---|---|---|---|---|
| Example 1 | 1.37 | 13.0 | 10.5 | OK (optical body was transferred to adherend) |
| Example 2 | 7.93 | 11.8 | 67.2 | OK (optical body was transferred to adherend) |
| Comparative example 1 | 9.30 | 13.0 | 71.5 | NG (whole optical body remained on transfer body) |

4. Example 3

(4-1. Preparation of Test Sample)

In Examples 3, 4 and Comparative examples 2, 3, the peeling force between the optical body and the covering body was studied. First, Example 3 will be described. In Example 3, a transfer body similar to that of Example 1 was produced. Then, after applying a resin (the same as that of Example 1) for the optical body onto the micro concave-convex structure of this transfer body, "PAC2-70" made by Sun A. Kaken Co., Ltd. was laminated on the uncured resin layer as the covering body. On this occasion, the covering body was compressed with a roll coater, and the applied thickness of the uncured resin layer was 1 μm similarly to Example 1. Then, by curing the uncured resin layer, a transfer laminate (test sample) was produced.

(4-2. B-C 90° Peel Test)

Then, this test sample was subjected to the B-C 90° peel test. A testing machine similar to that described above was used, the adhesion width was 25 mm, the test length was more than or equal to 150 mm, and the pull-up speed was 200 mm/min. The width of the test sample was agreed to 25 mm. As a result, the B-C 90° peeling force was 0.13 N/25 mm. Since the A-B 90° peeling force including tearing was 0.27 N/25 mm as measured in Example 1, the B-C 90° peeling force was smaller than the A-B 90° peeling force including tearing. In addition, during the peel test, the optical body was not broken, but remained on the transfer body.

5. Example 4

A test similar to that of Example 3 was performed except that FSA020M made by FUTAMURA CHEMICAL CO., LTD. was used as the covering body. As a result, the B-C 90° peeling force was 0.20 N/25 mm. Since the A-B 90° peeling force including tearing was 0.27 N/25 mm as measured in Example 1, the B-C 90° peeling force was smaller than the A-B 90° peeling force including tearing. In addition, during the peel test, the optical body was not broken, but remained on the transfer body.

6. Comparative Example 2

Processing similar to that of Example 3 was performed except that FSA020M processed at 60° C. for an hour was used as the covering body. The B-C 90° peeling force was 0.56 N/25 mm. Since the A-B 90° peeling force including tearing was 0.27 N/25 mm as measured in Example 1, the B-C 90° peeling force was larger than the A-B 90° peeling force including tearing. As a result, during the peel test, part of the optical body was broken and moved to the covering body.

7. Comparative Example 3

Processing similar to that of Example 3 was performed except that "FSA050M" made by FUTAMURA CHEMICAL CO., LTD. processed at 60° C. for an hour was used as the covering body. The B-C 90° peeling force was 0.93 N/25 mm. Since the A-B 90° peeling force including tearing was 0.27 N/25 mm as measured in Example 1, the B-C 90° peeling force was larger than the A-B 90° peeling force including tearing. As a result, during the peel test, part of the optical body was broken and moved to the covering body. Results of Examples 3, 4 and Comparative examples 2, 3 are collectively shown in Table 2.

TABLE 2

| | A-B 90° peeling force including tearing of B (N/25 mm) | B-C peeling force (N/25 mm) | Result of B-C 90° peel test |
|---|---|---|---|
| Example 3 | 0.27 | 0.13 | OK (optical body was peeled without being broken) |
| Example 4 | 0.27 | 0.20 | OK (optical body was peeled without being broken) |
| Comparative example 2 | 0.27 | 0.56 | NG (part of optical body was moved to covering body) |
| Comparative example 3 | 0.27 | 0.93 | NG (part of optical body was moved to covering body) |

The results of the above examples and comparative examples have revealed that, in order to transfer the optical body to the covering body with high accuracy, the A-B initial 90° peeling force needs to be less than or equal to 70% of the B-D 90° peeling force. Furthermore, it has been revealed that, in order to peel the covering body from the optical body with high accuracy, the B-C 90° peeling force needs to be smaller than the A-B 90° peeling force including tearing.

The preferred embodiment(s) of the present invention has/have been described above in detail with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 10 optical laminate
20 transfer laminate
30 transfer body 40 optical body
50 covering body

The invention claimed is:

1. A method for manufacturing an optical laminate, comprising:
    producing a transfer laminate having an optical body, in at least one surface of which a micro concave-convex structure in which concavities and convexities are arranged at an average cycle less than or equal to a visible light wavelength is formed, and a transfer body having an inverted concave-convex structure fitted in the micro concave-convex structure of the optical body;
    forming a bonding layer yet to be cured on at least part of a surface of an adherend;
    pressing the transfer laminate against the adherend such that an exposed surface of the optical body comes into contact with the bonding layer yet to be cured;
    curing the bonding layer yet to be cured; and
    peeling the optical body from the transfer body, wherein an initial 90° peeling force when peeling the optical body from the transfer body is less than or equal to 70% of a 90° peeling force between the optical body and the bonding layer.

2. The method for manufacturing an optical laminate according to claim 1, wherein
    the transfer laminate further has a covering body that covers one of surfaces of the optical body that is located on a side where the transfer body is not provided,
    in the method for manufacturing an optical laminate, the transfer laminate is pressed against the adherend after peeling the covering body from the transfer laminate, and
    a 90° peeling force between the optical body and the covering body is smaller than a 90° peeling force between the optical body and the transfer body including tearing of the optical body.

3. The method for manufacturing an optical laminate according to claim 1, wherein
    the 90° peeling force between the optical body and the bonding layer is more than or equal to 13 N/25 mm.

4. The method for manufacturing an optical laminate according to claim 1, wherein
    a total thickness of the optical body and the bonding layer is less than or equal to 15 μm.

5. The method for manufacturing an optical laminate according to claim 1, wherein
    the bonding layer is made of an ultraviolet-curing resin.

6. The method for manufacturing an optical laminate according to claim 1, further comprising a step of:
    subjecting a surface of the inverted concave-convex structure to mold release treatment.

* * * * *